United States Patent [19]

Ross et al.

[11] Patent Number: 5,058,172

[45] Date of Patent: Oct. 15, 1991

[54] ELECTROMAGNETIC INTERFERENCE SUPPRESSANT ASSEMBLY

[75] Inventors: Bruce W. Ross; John C. Dzung, both of Sunrise; Harold J. Sanderson, Lauderdale Lakes, all of Fla.

[73] Assignee: Motorola, Inc., Schaumburg, Ill.

[21] Appl. No.: 607,190

[22] Filed: Oct. 31, 1990

[51] Int. Cl.$^5$ .................. H01R 13/56; H04R 1/06
[52] U.S. Cl. .................. 381/122; 174/135; 333/12; 333/185; 336/175; 439/88; 439/447; 455/307
[58] Field of Search .............. 174/32, 35 R, 35 C, 174/135; 333/12, 181, 182, 183, 185; 336/175, 176; 381/93, 94, 122, 124, 189; 439/88, 445, 447, 448, 449, 607, 620; 455/283, 286, 300, 307

[56] References Cited

U.S. PATENT DOCUMENTS 4,960,392 10/1990 Dickie .................. 333/185 X

FOREIGN PATENT DOCUMENTS

| 61-116021 | 7/1986 | Japan | 174/135 |
| 1160157 | 7/1969 | United Kingdom | 381/189 |
| 1445681 | 8/1976 | United Kingdom | 439/620 |

OTHER PUBLICATIONS

CAPCON ®, Inc. (New York, NY), EMI Suppressant Tubing catalog sheets (two).

Primary Examiner—Laramie E. Askin
Attorney, Agent, or Firm—Daniel K. Nichols

[57] ABSTRACT

A cable assembly 100 capable of electromagnetic interference suppression a cable strain includes relief 106, a tubular electromagnetic interference suppressor 110 located within the strain relief 106, both of which are disposed around electrical cable 102. The electromagnetic interference suppressor 110 attenuates any electromagnetic interference ("EMI") which might get coupled to electrical cable 102. By attenuating the EMI coupled to electrical cable 102 the problems associated with the electromagnetic interference can be minimized.

15 Claims, 3 Drawing Sheets

ELECTROMAGNETIC INTERFERENCE SUPPRESSANT ASSEMBLY

TECHNICAL FIELD

This invention relates generally to the field of electromagnetic interference suppressant assemblies, and more specifically to a cable assembly with electromagnetic interference suppression.

BACKGROUND

Electronic equipment must often function in the presence of high frequency disturbances. These disturbances normally are generated by external sources, but sometimes can be generated by the electronic equipment itself. These disturbances or high frequency interferences are often referred to as electromagnetic interference (hereinafter "EMI"). EMI can cause tremendous problems with sensitive electronic circuits, especially those found in communication devices (e.g. two-way radios). It is also common for interference to be referred to as radio frequency interference (hereinafter "RFI") when speaking about radio communication equipment.

Methods of reducing EMI/RFI interference include the use of shielded housings and cables, EMI filters, ferrite beads, and EMI suppressant tubing. Each of these methods has its advantages and disadvantages in terms of both cose, and ease of implementation. For example, ferrite beads are very useful in electronic applications in attenuating EMI from cables carrying electrical signals. Unfortunately, ferrites have the disadvantages of being rigid and normally require large amounts of space to implement. In comparison, conventional EMI suppressant tubing provides a simple, low cost, means of suppressing undesired EMI in electrical cables. Since EMI suppressant tubing is flexible, it can be slipped over standard cables, and can suppress both conducted and radiated electromagnetic interference.

A need arises in the field of radio communications for cable assemblies having EMI suppressant capabilities. For example, in normal communication applications, users will normally use devices such as remove speaker/microphones which are attached to two-way radios. Since the radio antenna is normally emitting strong electromagnetic fields, there is a strong tendency for electromagnetic energy to be coupled back into the radio via the remote speaker/microphone cable. This interference causes serious problems for the sensitve electronic circuits in the radio. The electromagnetic interference causes such problems as audio and radio frequency "densense " which tends to render radios inoperable.

A cable assembly which can suppress electromagnetic interference and would take up minimal space would be very beneficial.

SUMMARY OF THE INVENTION

Briefly, according to the invention, a cable assembly which can suppress interference that gets coupled to the cable is disclosed.

In one aspect of the present invention the cable assembly includes a a cable strain relief which has a retaining means for retaining a tubular electromagnetic interference suppressor inside the strain relief.

In another aspect of the invention, a microphone cable which suppresses electromagnetic interference is disclosed.

In still another aspect of the invention, a communication device assembly with electromagnetic interference suppression capability is disclosed.

DETAILED DESCRIPTION OF THE PREFERRED EMBODIMENT

Figure 1:
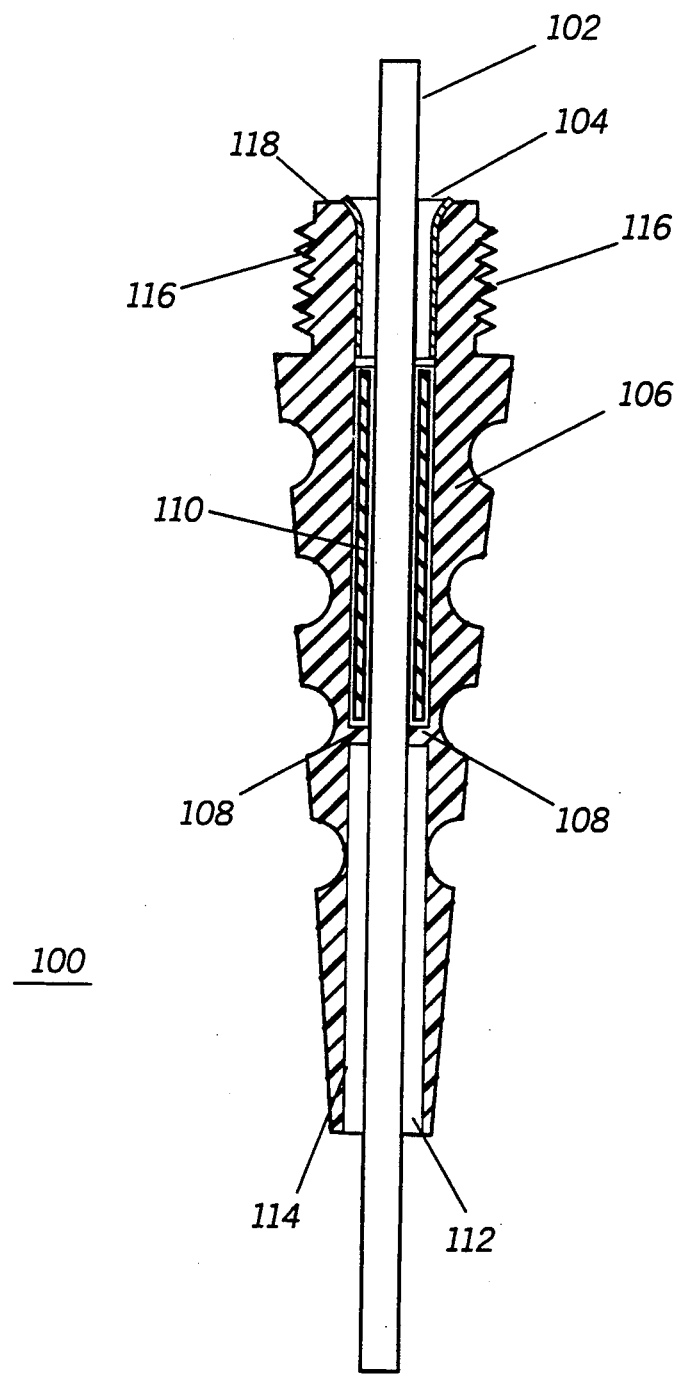
FIG. 1 is a cross-sectional view of a cable assembly with electromagnetic interference suppression in accordance with the present invention.

Referring to FIG. 1, a cross-sectional view of a cable assembly 100 in accordance with the present invention is shown. Cable assembly 100 is suitable for use with electronic devices such as communication equipment, two-way radio remote speaker/microphone assemblies, etc. Any electrical device which is sensitive to the effects of electromagnetic interference ("EMI") and utilizes electrical cables can utilize the present invention.

Cable assembly 100 includes a cable strain relief 106 preferably made out of polyurethane. The strain relief 106 can be made out of many other different types of materials such as rubber and other types of plastics but should preferably have some amount of resilience to its structure. In the preferred embodiment, strain relief 106 is approximately 2.2 inches long, and has an inner wall cavity 112 running through the length of the strain relief, which has a diameter of approximately 0.25 inch. Also included as part of the assembly 100 is a conventional tublar electromagnetic interference suppressor 110 such as EMI suppressant tubing manufactured by Capcon, Inc. The EMI suppressor 110 preferably has a length of 1 inch and an inner diameter of 0.19 inch with a wall thickness of 0.02 inch. Both the strain relief 106 and electromagnetic interference suppressor 110 are disposed around electrical cable 102. Electrical cable 102 can be any type of cable which can carry electrical information. In the preferred embodiment cable 102 has an outside diameter of approximately 0.190 inch; and has several internal conductors 202.

Cable assembly 100 is built by first inserting cable 102 through strain relief 106 and then inserting the tubular electromagnetic interference suppressor 110. Electromagnetic interference suppressor 110 rests against a retaining means which is part of the strain relief 106, preferably tubing retainer 108. Tubing retainer 108 is an area in the inner wall 114 which has a smaller diameter (approximately 0.19 inch) than the rest of the inner wall cavity 112, thereby retaining the electromagnetic interference suppressor 110 at a predetermined location. Since strain relief 106 is a molded piece, it is simple to design in the tubing retainer 108. Other means of retaining the EMI suppressor 110 can also be used, such as by the use of an interference fit, or by using mechanical fasteners that are known in the art.

Once the electromagnetic interference suppressor 110 is resting inside of the cable strain relief 106, a spacer 104 is passed through the cable 102, and the larger diameter end of spacer 104 is pressed against the strain relief top end 118. The outside diameter of spacer 104 should be slightly larger (approximately 0.270 inch)

than the diameter of inner wall cavity 112, thereby causing an interference fit between the spacer 104 and the strain relief 106. Since the strain relief 106 has some resilience, the inner wall 114 will "give" allowing for the spacer 104 to be inserted, and is kept in place by this interference fit. Once spacer 104 is in place, the electromagnetic interference suppressor 110 is held in place between the spacer 104 and the tubing retainer 108. Spacer 104 can be made of almost any material, but it is preferably made out of metal such as brass. The spacer 104 has an approximate length of 0.4 inch. Once the spacer 104 is pressed into the strain relief 106, the friction between the out wall of the spacer and the inner wall 114 of the strain relief keep the spacer 104 in place.

Strain relief 106 also includes in one end of its body a set of premolded threads 116 which allows the strain relief 106 to be attached. The threads allow for either a friction fit or threading into an external housing member. The strain relief allows for the cable 102 to be held in place to an external device, and also protects the external device from any forces exerted on the cable 102.

Figure 2:
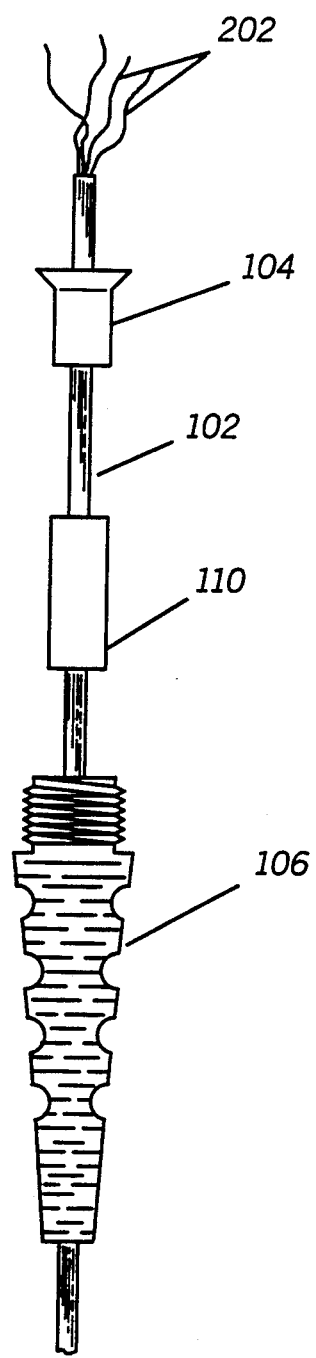
FIG. 2 is an exploded view of the cable assembly of FIG. 1.

In FIG. 2 an exploded view of the cable assembly is shown. The cable assembly consists of cable strain relief 106, EMI suppressor 110, and spacer 104. All three pieces are inserted about electrical cable 102. Cable 102 is a multiconductor cable having several inner wires 202. The cable assembly is made by sliding the EMI suppressor inside of the cable strain relief 106, and pressing the spacer 104 over the strain relief 106. The EMI suppressor 110 is held between one end of spacer 104 and the EMI tubing retainer 108 (shown in FIG. 1) found in the inside wall of strain relief 106. The strain relief 106 is preferably friction fit to the cable 102 in order to avoid the strain relief 106 from sliding around the cable 102.

Figure 3:
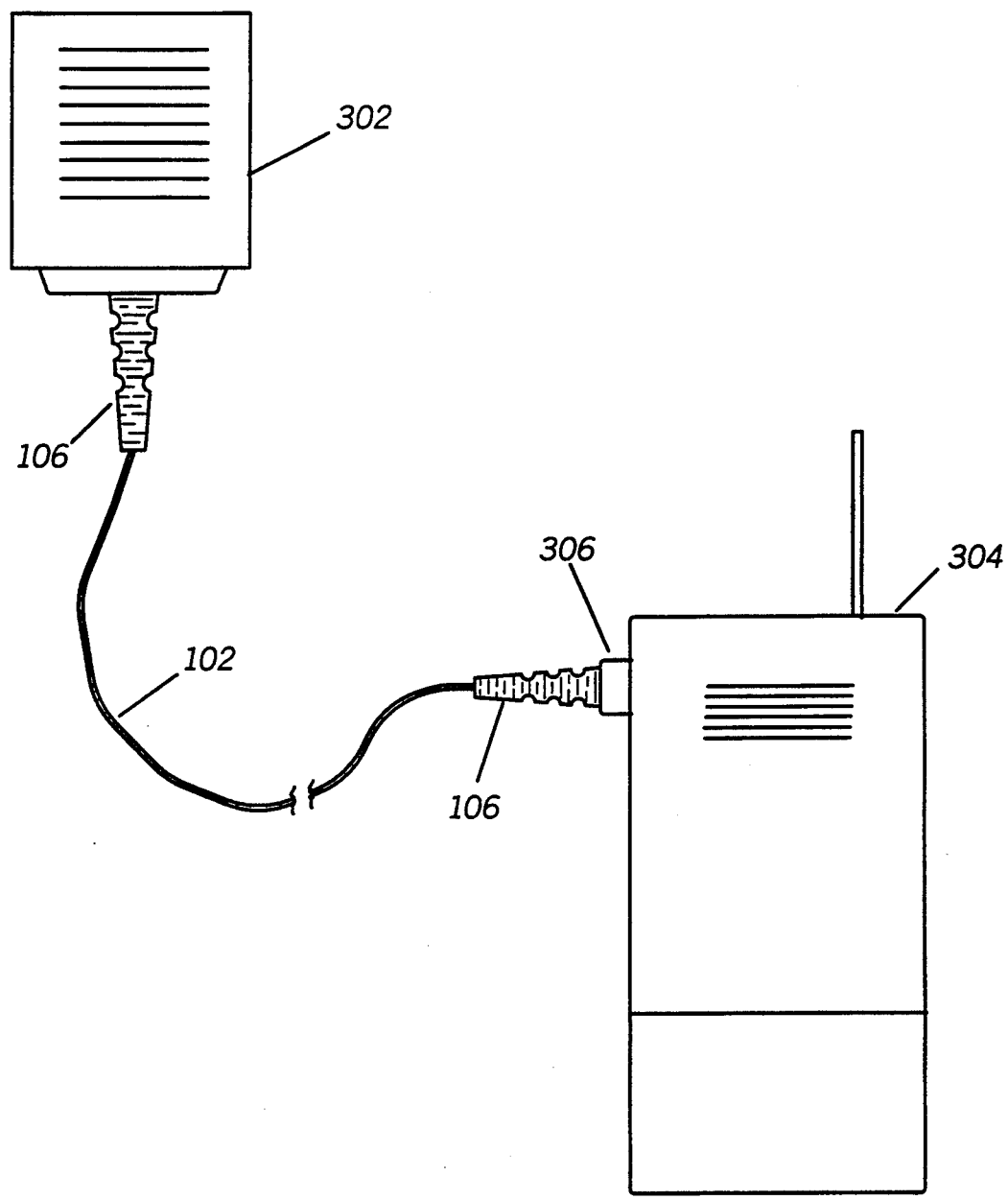
FIG. 3 is a drawing of a microphone cable assembly in accordance with the present invention.

Referring to FIG. 3, a remote microphone assembly is shown. The microphone assembly 302 is connected to a conventional communication device 304 such as a two-way portable radio. Other types of communication devices such as cellular telephones, mobile radios, and other similar communication devices can use this microphone assembly. The microphone assembly 302 comprises a conventional microphone located inside a housing assembly which allows the radio user to speak remotely to the radio 304 which then transmits the voice message. The radio 304 and the microphone assembly 302 are connected together using a cable assembly in accordance with the present invention. The microphone assembly 302 is attached to a cable strain relief 106 which has a EMI suppressor located inside the strain relief 106 thereby reducing the electromagnetic interference which is coupled to cable 102.

The other end of the microphone assembly 302 is connected to radio 304 using an electrical connector 306. This end of the cable assembly also includes a strain relief 106 which includes an EMI suppressor 110 (shown in FIG. 2) inside the strain relief 106. The strain relief 106 is connected to the electrical connector 306 by way of the strain relief threads 116 (shown in FIG. 1) which are friction fit to the connector 306.

The microphone assembly 302 can also include a speaker thereby making the assembly a remote speaker/microphone assemby. The speaker/microphone assembly would include a conventional speaker and microphone which allows the radio user to speak and listen remotely to and from radio 304. The speaker and microphone are electrically connected to the radio via inner wires 202 (conductors) found inside of cable 102.

The addition of EMI suppressant tubing on both sides of the cable assembly minimizes any electromagnetic interference which might get coupled to cable 102. EMIT coupling is a very common occurence in communication equipment due to the strong radio frequency signals generated by radio 304 via the antenna. Normally, electromagnetic energy tends to get coupled to cable 102 which in turn tends to get fed back into radio 304, causing interference problems to some of the sensitive electronic circuits. The addition of the EMI suppressant tubing attenuates the coupled EMI by approximately 40 db, thereby minimizing the possibilities of interference to the radio 304.

This cable assembly provides for enhanced EMI attenuation without requiring the use of ferrite beads, or similar technologies. Incorporation of the EMI suppressant tubing within the strain relief 106 provides the necessary decoupling at the radio 304, thereby minizing the probability of interference. The strain relief 106, which is necessary for supporting the cable 102, additionally functions as the housing for the electromagnetic interference suppressors 110.

While a specific embodiment of this invention has been described above, further modifications and improvements will occur to those skilled in the art. Therefore, it should be understood that this invention is not limited to the particular form shown, and that the appended claims are intended to cover all modifications which fall under the spirit and scope of this invention.

What is claimed is:

1. A cable assembly with electromagnetic interference suppression capability, comprising:
   an electrical cable;
   a cable strain relief disposed about the electrical cable; and
   a flexible tubular electromagnetic interference suppressor located within the cable strain relief and about the cable.

2. The cable assembly as defined in claim 1, wherein the cable strain relief includes a cavity and the flexible tubular electromagnetic interference suppressor is within the cavity.

3. The cable assembly as defined in claim 2, wherein the cable strain relief has a retaining means for retaining the flexible tubular electromagnetic interference suppressor.

4. The cable assembly as defined in claim 3, further comprising a spacer disposed about the electrical cable, one end of the spacer being located approximately against the tubular electromagnetic interference suppressor, and the other end of the spacer a having substantially larger outside diameter than the one end of the spacer and being pressed against the top end of the cable strain relief.

5. The cable assembly as defined in claim 3, further comprising a spacer which is located partially within the cable strain relied and about the cable the spacer further being located between the flexible tubular electromagnetic interference suppressor and the top end of the cable strain relief.

6. A microphone cable assembly with electromagnetic interference suppression capability, comprising:
   an electrical cable;
   at least one cable strain relief disposed about the electrical cable;

a flexible tubular electromagnetic interference suppressor located within the cable strain relief and about the cable; and a microphone coupled to the cable.

7. The microphone cable assembly as defined in claim 6, wherein the cable strain relief includes a cavity and the flexible tubular electromagnetic interference suppressor is within the cavity.

8. The microphone cable assembly as defined in claim 7, wherein the cable strain relief has a retaining means for retaining the flexible tubular electromagnetic interference suppressor.

9. The microphone cable assembly as defined in claim 8, further comprising a spacer disposed about the electrical cable, one end of the spacer being located approximately against the flexible tubular electromagnetic interference suppressor, and the other end of the spacer having a substantially larger outside diameter than the one end of the spacer and being pressed against the top end of the cable strain relief.

10. The microphone cable assembly as defined in claim 8, further comprising a spacer which is located partially within the cable strain relief and about the cable the spacer further being located between the flexible tubular electromagnetic interference suppressor and the top end of the cable strain relief.

11. A communication device assembly, comprising:

an electrical cable;

at least one cable strain relief disposed about the electrical cable;

a flexible tubular electromagnetic interference suppressor located within the cable strain relief and about the cable; and a communication device coupled to the cable strain relief.

12. The communication device assembly as defined in claim 11, wherein the cable strain relief includes a cavity and the flexible tubular electromagnetic interference suppressor is within the cavity.

13. The communication device assembly as defined in claim 12, wherein the cable strain relief has a retaining means for retaining the flexible tubular electromagnetic interference suppressor.

14. The communication device assembly as defined in claim 13, further comprising a spacer disposed about the electrical cable one end of the spacer being located approximately against the flexible tubular electromagnetic interference suppressor, and the other end of the spacer having a substantially larger outside diameter than the one end of the spacer and being pressed against the top end of the cable strain relief.

15. The communication device assembly as defined in claim 13, further comprising a spacer which is located partially within the cable strain relief and about the cable the spacer further being located between the flexible tubular electromagnetic interference suppressor and the top end of the cable strain relief.

* * * * *